(12) United States Patent
Furukawa et al.

(10) Patent No.: US 7,740,319 B2
(45) Date of Patent: Jun. 22, 2010

(54) HEADRESTS FOR VEHICLE SEATS

(75) Inventors: Kenji Furukawa, Toyota (JP);
Kimitaka Ando, Toyota (JP); Ryoshu Nakane, Toyota (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 78 days.

(21) Appl. No.: 12/210,449

(22) Filed: Sep. 15, 2008

(65) Prior Publication Data
US 2009/0102266 A1 Apr. 23, 2009

(30) Foreign Application Priority Data
Oct. 22, 2007 (JP) ............................. 2007-273724

(51) Int. Cl.
*A47C 7/36* (2006.01)
(52) U.S. Cl. ..................... 297/408; 297/391
(58) Field of Classification Search ................ 297/391, 297/408, 410
See application file for complete search history.

(56) References Cited

U.S. PATENT DOCUMENTS

| | | | | |
|---|---|---|---|---|
| 4,626,028 A * | 12/1986 | Hatsutta et al. | ............. | 297/289 |
| 5,011,225 A * | 4/1991 | Nemoto | ...................... | 297/408 |
| 6,485,096 B1 * | 11/2002 | Azar et al. | ..................... | 297/61 |
| 6,935,696 B2 * | 8/2005 | Gauthier et al. | ............. | 297/408 |
| 7,044,555 B2 * | 5/2006 | Saberan | ...................... | 297/408 |
| 7,325,877 B2 * | 2/2008 | Brockman et al. | .......... | 297/408 |
| 7,422,280 B2 * | 9/2008 | Brockman | ............. | 297/216.12 |
| 7,575,282 B2 * | 8/2009 | Sutter et al. | ................. | 297/403 |

FOREIGN PATENT DOCUMENTS

JP 4-44130 Y2 10/1992

* cited by examiner

*Primary Examiner*—Sarah B McPartlin
(74) *Attorney, Agent, or Firm*—Greenblum & Bernstein, PLC (57) ABSTRACT

A headrest for a vehicle seat has a base member attached to a seatback of the vehicle seat, a body frame attached to the base member so as to be capable of tilting, a locking device for locking the body frame with the base member so as not to be capable of tilting, and an unlocking device for unlocking the locking device. The unlocking device includes a swinging body attached to the base member so as to be capable of swinging and a moving body attached to the body frame so as to be capable of moving with respect thereto. The moving body moves with respect to the body frame by being pushed by the swinging body to unlock the locking device. The swinging body has a connecting portion to which one end of a cable is connected and an arcuate-shaped outer peripheral surface on which the cable is disposed. And the cable is retracted into a tubular portion provided on the base member from an entrance of the tubular portion when the cable is pulled to unlock the locking device. The entrance of the tubular portion is located substantially on a tangent line of the arc of the outer peripheral surface.

4 Claims, 6 Drawing Sheets

HEADRESTS FOR VEHICLE SEATS

This application claims priority to Japanese patent application serial number 2007-273724, the contents of which are incorporated herein by reference.

BACKGROUND OF THE INVENTION

1. Field of the Invention

The present invention relates to a headrest for a vehicle seat and, more specifically, to a headrest which tilts with respect to a seatback.

2. Description of the Related Art

In Japanese Utility Model Publication No. H04-44130, a headrest which tilts with respect to seatback is disclosed. The headrest of this type is tiled and inclined down to secure visibility toward the front or toward the rear. Or, when the seatback is inclined on a seat cushion, the headrest is tiled and inclined down for avoiding interference with a seat in front of the seat having the headrest. Provided between the headrest and the seatback are a locking device for locking the headrest so as not to tilt with respect to the seatback and an unlocking device for unlocking the locking device. The unlocking device is adapted to be operated by pulling a cable to unlock the locking device.

However, the distal end of the cable is also tilted with respect to the seatback together with the headrest. Therefore, when the headrest is tilted, the cable is bent significantly and a force is applied. And the cable receives a large force when the cable is pulled in a significantly bent state. As a result, the cable can be deformed or broken, and the operability of the cable is deteriorated.

Thus, there is need in the art for a headrest for a vehicle seat, in which a headrest includes a locking device for locking the headrest so as not to tilt with respect to a seatback and a cable to be operated when unlocking the locking device, absent any large forces applied to the cable.

SUMMARY OF THE INVENTION

One aspect of the present invention can include a headrest includes a base member attached to a seatback of the vehicle seat, a body frame attached to the base member so as to be capable of tilting, a locking device for locking the body frame with the base member so as not to be capable of tilting, and an unlocking device for unlocking the locking device. The unlocking device includes a swinging body attached to the base member so as to be capable of swinging and a moving body attached to the body frame so as to be capable of moving with respect thereto. The moving body moves with respect to the body frame by being pushed by the swinging body to unlock the locking device. The swinging body includes a connecting portion to which one end of a cable is connected and an arcuate-shaped outer peripheral surface on which the cable is disposed. The cable is retracted into a tubular portion provided on the base member from an entrance of the tubular portion when the cable is pulled to unlock the locking device. The entrance of the tubular portion is located substantially on a tangent line of the arc of the outer peripheral surface.

Therefore, when the cable is pulled, the swinging body swings, and the cable disposed on the arcuate shaped outer peripheral surface of the swinging body is retracted into the tubular portion from the entrance of the tubular portion located substantially on the tangent line of the ark. Therefore, the angle of insertion of the cable into the tubular portion does not change much irrespective of the pulled amount. Accordingly, the cable is hard to be applied with a large force. In addition, the swinging body pushes the moving body provided on the body frame by the swinging movement thereof, and unlocks the locking device via the moving body. Therefore, when the body frame is tilted with respect to the base member, the moving body moves with the body frame separately from the swinging body and moves away from the swinging body. Therefore, when the body frame is tilted with respect to the base member, exertion of a large force on the cable connected to the swinging body is prevented.

DETAILED DESCRIPTION OF THE INVENTION

Each of the additional features and teachings disclosed above and below may be utilized separately or in conjunction with other features and teachings to provide improved headrests for vehicular seats. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
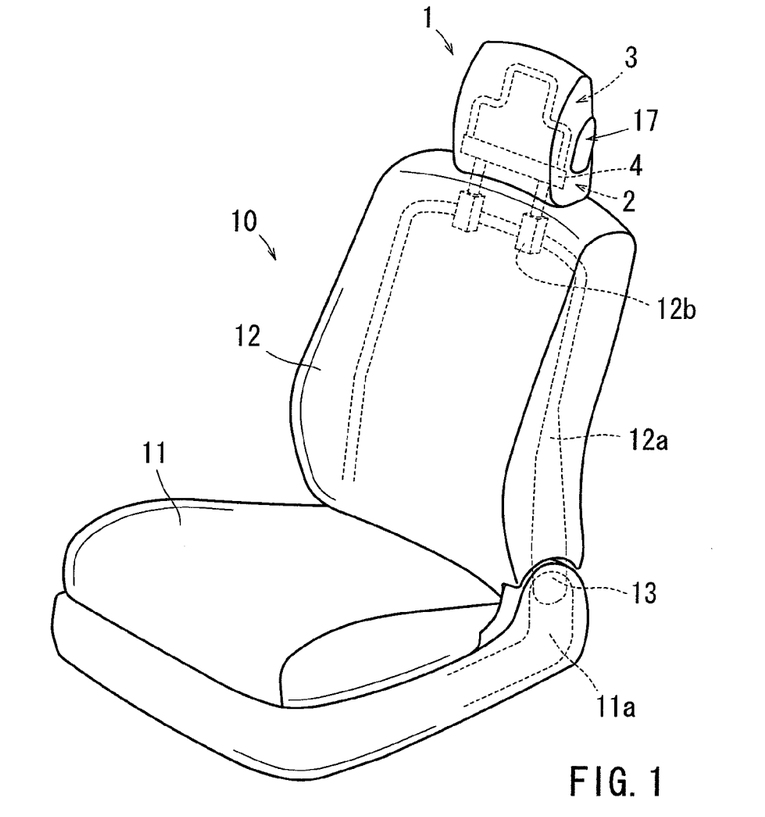
FIG. 1 is a perspective view of a vehicular seat.

As shown in FIG. 1, a vehicle seat 10 includes a seat cushion 11, a seatback 12 and a headrest 1. The seat cushion 11 and the seatback 12 include frames 11a, 12a. A reclining device 13 is provided between the frames 11a, 12a connected thereto so as to be capable of swinging and capable of being adjustable in angle. A pair of tubular attaching members 12b are attached to the upper side of the frame 12a, and the headrest 1 is attached to the attaching members 12b.

Figure 2:
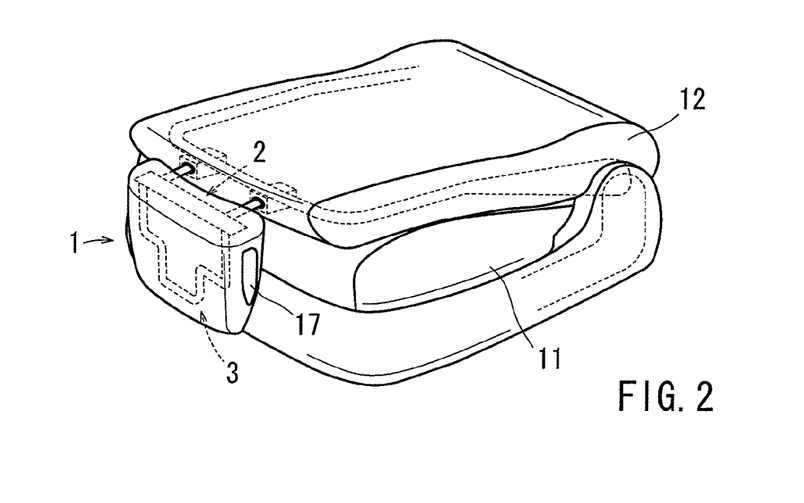
FIG. 2 is a perspective view of the vehicular seat in case a seatback is inclined forward.
Figure 3:
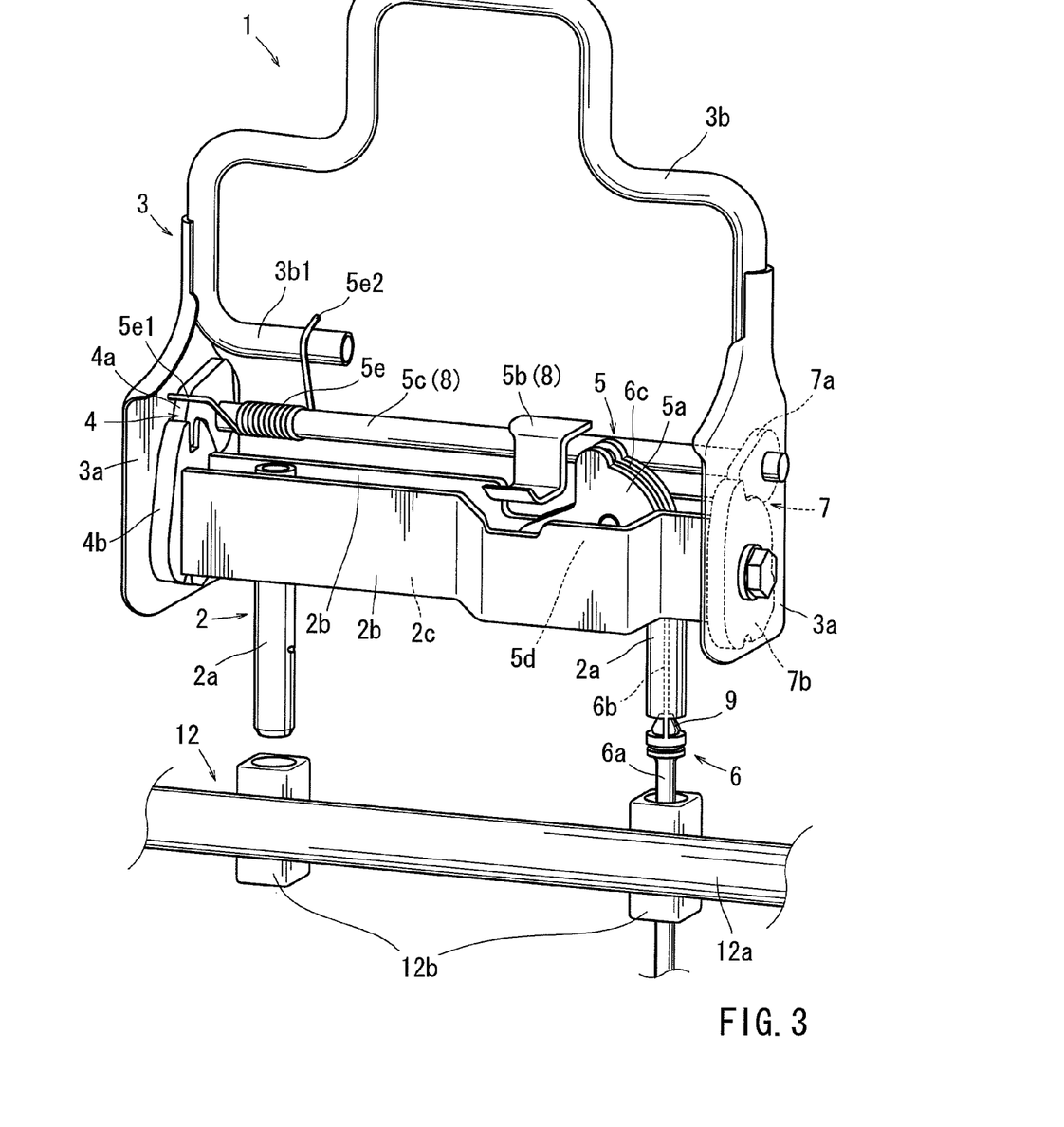
FIG. 3 is a perspective view of a frame of a headrest.

The headrest 1 is provided so as to be capable of tilting with respect to the seatback 12 as shown in FIGS. 1 and 2, and is tilted to secure visibility. Alternatively, it is tilted in order to avoid interference of the headrest 1 with a seat in front of the seat 10 when the seatback 12 is inclined forward on the seat cushion 11. As shown in FIG. 3, the headrest 1 includes a base member 2 and a body frame 3 attached to the base member 2 so as to be capable of tilting.

The base member 2 includes a pair of tubular (for example, circular cylindrical) stays 2a and bridge plates 2b for connecting the pair of stays 2a. The stays 2a are slidably inserted into the attaching members 12b and are attached so as to be adjustable in vertical position with respect to the seatback 12.

The bridge plates 2b are provided on the front side and the back side of the upper ends of the stays 2a so as to connect the upper ends of the pair of stays 2a with respect to each other.

Figure 4:
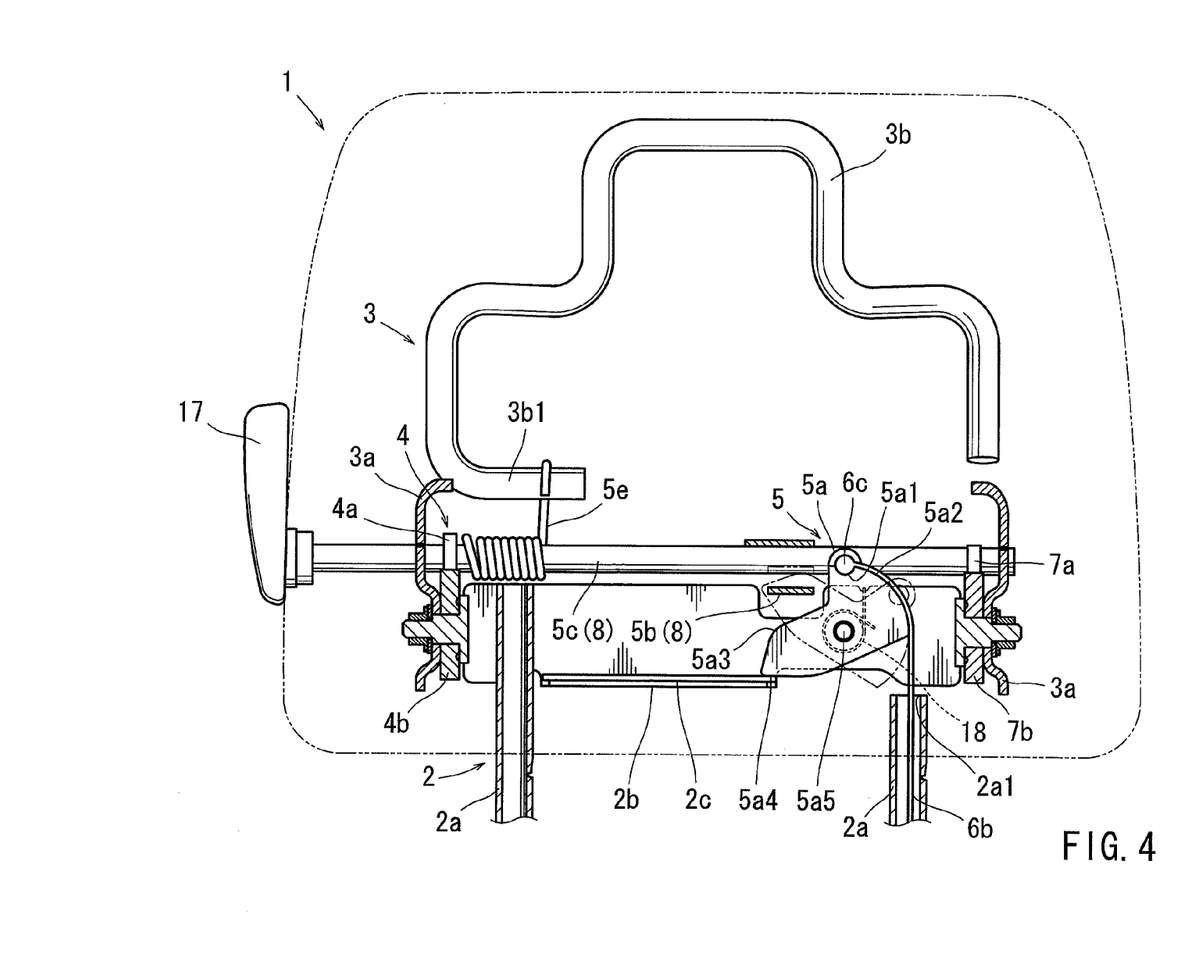
FIG. 4 is a rear view of the frame of the headrest.
Figure 5:
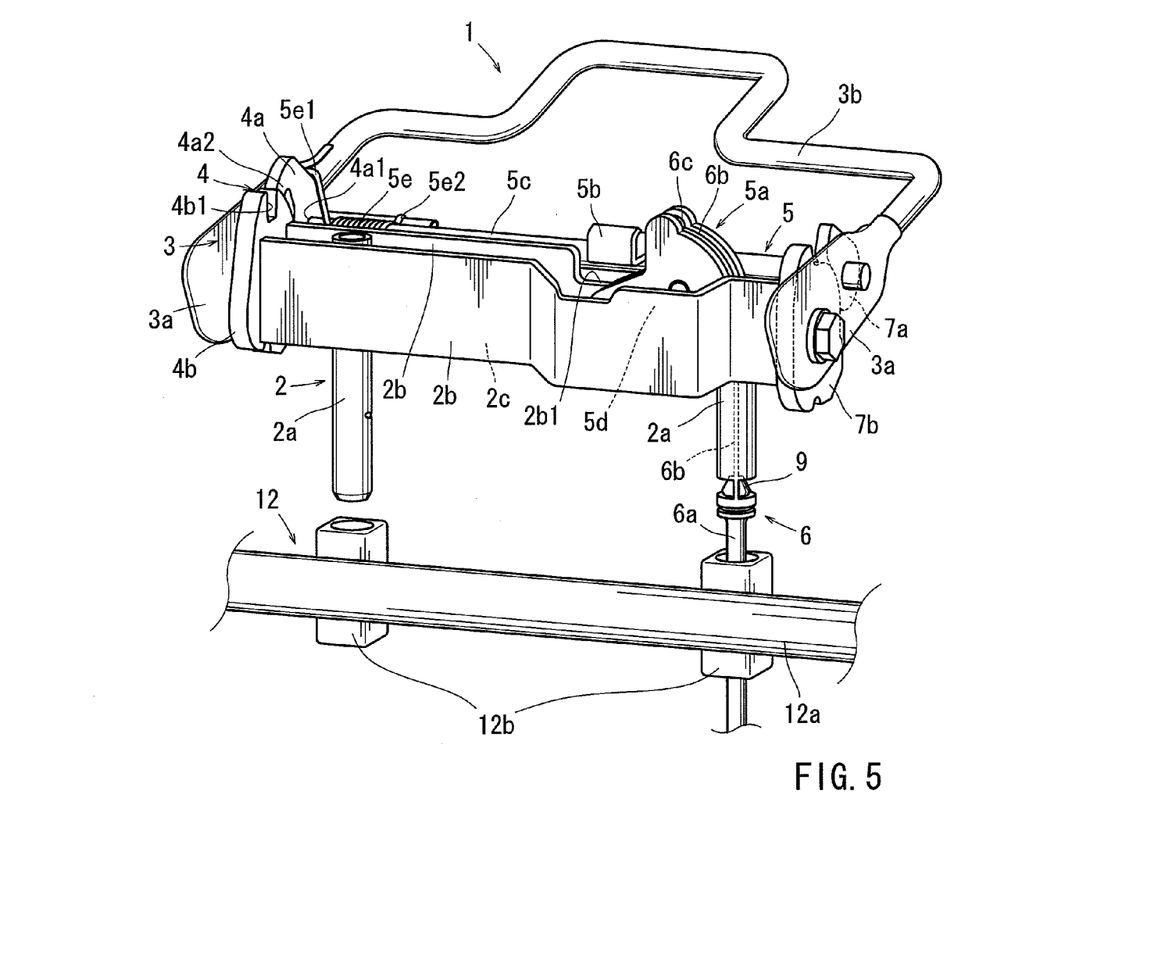
FIG. 5 is a perspective view of the frame of the headrest when a body frame is inclined forward.

The body frame 3 includes left and right attaching plates 3a and a tubular connecting tube 3b as shown in FIGS. 3 and 4. The attaching plates 3a are pivotably attached to the ends of the bridge plates 2b. The connecting tube 3b extends upward from the left and right attaching plates 3a and are joined, so that an upper framework of the headrest 1 is configured.

Figure 6:
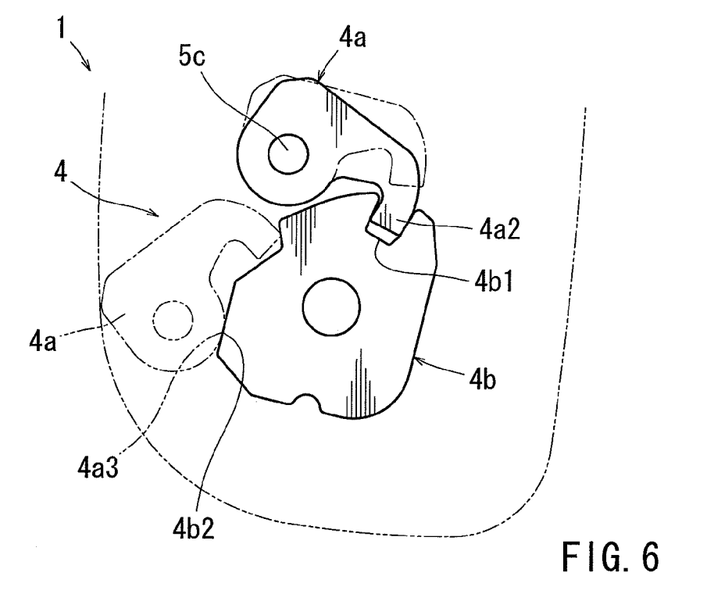
FIG. 6 is a side view of a locking device.

Provided between the base member 2 and the body frame 3 are a locking device 4 and an unlocking device 5, as shown in FIGS. 3 and 4. The locking device 4 is a device to lock the body frame 3 with respect to the base member 2 at a position in use, and includes a lock base 4b and a hook 4a. The lock base 4b is fixed to an end, for example, to the left ends of the bridge plates 2b of the base member 2. The hook 4a is fixed to a rod 5c. The rod 5c is rotatably attached to the attaching plates 3a about the axis thereof. Therefore the hook 4a rotates and tilts together with the rod 5c about the axis of the rod 5c with respect to the body frame 3. The tip end of the hook 4a in terms of the direction of tilting movement is formed with a hocking portion 4a2 as shown in FIG. 6. The hook 4a locks the body frame 3 with respect to the base member 2 by the hocking portion 4a2 being fitted into a recess 4b1 formed on the outer peripheral portion of the lock base 4b.

As shown in FIGS. 3 and 4, an biasing member 5e of biasing the hook 4a to engage the lock base 4b is inserted into the rod 5c. The biasing member 5e, which can be a coil spring, is engaged at one end thereof with the outer peripheral surface of the hook 4a and is hooked at the other end thereof with a locking portion 3b1 of the body frame 3. Accordingly, the biasing member 5e bias the hook 4a in the direction which causes the locking portion 4a2 in the recess 4b1, and the hook 4a is locked with respect to the lock base 4b.

The unlocking device 5 is a device to unlock the locking device 4, and includes a swinging body (pulley) 5a and a moving body 8 as shown in FIGS. 3 and 4. The swinging body 5a is attached between the pair of bridge plates 2b so as to be capable of swinging and swings with respect to the base member 2. A swing shaft 5a5 of the swinging body 5a is oriented substantially vertically with respect to the front surface of the headrest 1, and the swinging body 5a tilts in the direction parallel to the front surface of the headrest 1. The swinging body 5a includes a connecting portion 5a1 to which an inner cable 6b of a cable 6 is connected and an arcuate-shaped outer peripheral surface 5a2 at an end thereof. The outer peripheral surface 5a2 is formed with a groove in which the inner cable 6b is installed.

As shown in FIG. 4, the swinging body 5a is formed with a force applying portion 5a3 and a stopper portion 5a4 on the outer peripheral surface on the other end thereof. The force applying portion 5a3 pushes a force receiving member 5b of the moving body 8 upward when the swinging body 5a swings clockwise. The stopper portion 5a4 limits the amount of swinging motion of the swinging body 5a by coming into contact with a stopper strip 2c formed at the lower end of the bridge plate 2b when the swinging body 5a swings counterclockwise.

As shown in FIG. 4, a biasing member 18 is provided between the swinging body 5a and the bridge plates 2b. The biasing member 18 biases the swinging body 5a counterclockwise constantly in the direction to cause the force applying portion 5a3 to move away from the force receiving member 5b. The force applying portion 5a3 is moved away from the force receiving member 5b, thereby forming an allowance in the pulling direction of the inner cable 6b. Therefore, this allowance prevents exertion of an excessive force to the inner cable 6b. Besides the biasing member 18 pulls the inner cable 6b via the swinging body 5a. Therefore, sagging of the inner cable 6b is also prevented.

As shown in FIGS. 3 and 4, the moving body 8 includes the rod 5c and the force receiving member 5b. The rod 5c extends across the left and right attaching plates 3a, and is attached to the attaching plates 3a so as to be capable of rotation about the axis thereof. The force receiving member 5b protrudes from the substantially center of the rod 5c toward the swinging body 5a, and the tip end thereof is pushed upward by the force applying portion 5a3 of the swinging body 5a when the swinging body 5a swings. Accordingly, the force receiving member 5b rotates the rod 5c about the axis thereof. Therefore, the moving body 8 rotates (moves) with respect to the body frame 3 against the biasing member 5e.

When the rod 5c rotates about the axis thereof, the hook 4a rotates with the rod 5c. Accordingly, as shown in FIG. 6, the hocking portion 4a2 comes apart from the recess 4b1, and the locking device 4 is unlocked. Consequently, tilting movement of the body frame 3 with respect to the base member 2 is enabled. In this state, when the body frame 3 is tilted with respect to the base member 2, the hook 4a tilts forward relative to the lock base 4b. At this time, the hook 4a moves along the lock base 4b as shown in FIG. 6.

In order to limit the amount of forward inclination of the body frame 3, a protruded portion 4a3 and a stopper portion 4b2 are formed between the hook 4a and the lock base 4b as shown in FIG. 6. The protruded portion 4a3 is formed on the outer peripheral surface of the proximal end of the hook 4a, and is protruded toward the lock base 4b. The stopper portion 4b2 is formed on the outer peripheral surface of the lock base 4b to limit the movement of the hook 4a by the protruded portion 4a3 coming into abutment therewith, thereby limiting the amount of forward inclination of the body frame 3.

As shown in FIGS. 3 and 4, a tilting movement stopper device 7 for limiting the forward and backward inclinations of the body frame 3 is provided between the base member 2 and the body frame 3. The tilting movement stopper device 7 includes a stopper base 7b and a stopped member 7a. The stopper base 7b is fixed to one end, for example, to the right end of the bridge plates 2b of the base member 2. The stopped member 7a is fixed to one end of the rod 5c, and is attached to the body frame 3 via the rod 5c so as to be capable of tilting.

Figure 7:
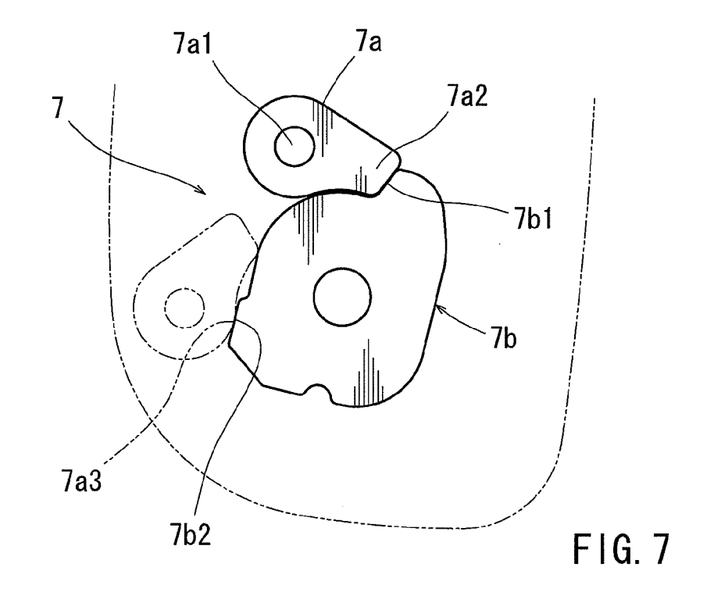
FIG. 7 is a side view of a tilting movement stopper device.

The stopped member 7a includes a tilting extremity 7a2 as shown in FIG. 7, and prevents the body frame 3 from inclining rearward with respect to the base member 2 by the tilting extremity 7a2 coming into abutment with a projection 7b1 formed on the outer peripheral portion of the stopper base 7b. The stopped member 7a includes a protruded portion 7a3 protruding toward the stopper base 7b on the outer peripheral surface of the proximal end portion thereof, and limits the forward inclination of the body frame 3 with respect to the base member 2 by the protruded portion 7a3 coming into abutment with the stopper portion 7b2 formed on the outer peripheral surface of the stopper base 7b.

As shown in FIG. 3, the cable 6 for causing the swinging body 5a to swing includes the inner cable 6b and an outer cable 6a. The outer cable 6a has a tubular shape and includes a connector 9 attached to one end thereof. The connector 9 is connected to the lower end of the stay 2a. The inner cable 6b is slidably stored in the outer cable 6a and, as shown in FIG. 4, includes a column portion 6c at one end thereof, and the column portion 6c is connected to the connecting portion 5a1 of the swinging body 5a. Then, the inner cable 6b is disposed along the arcuate-shaped outer peripheral surface 5a2 of the swinging body 5a, and is inserted into the stay 2a through the entrance 2a1 of the stay (tubular portion) 2a located substantially on the tangent line of the arc of the outer peripheral surface 5a2, and then is inserted into the outer cable 6a. Therefore, the inner cable 6b is always capable of being inserted at angles, for example, within ±10° with respect to the stay 2a and the outer cable 6a.

Figure 8:
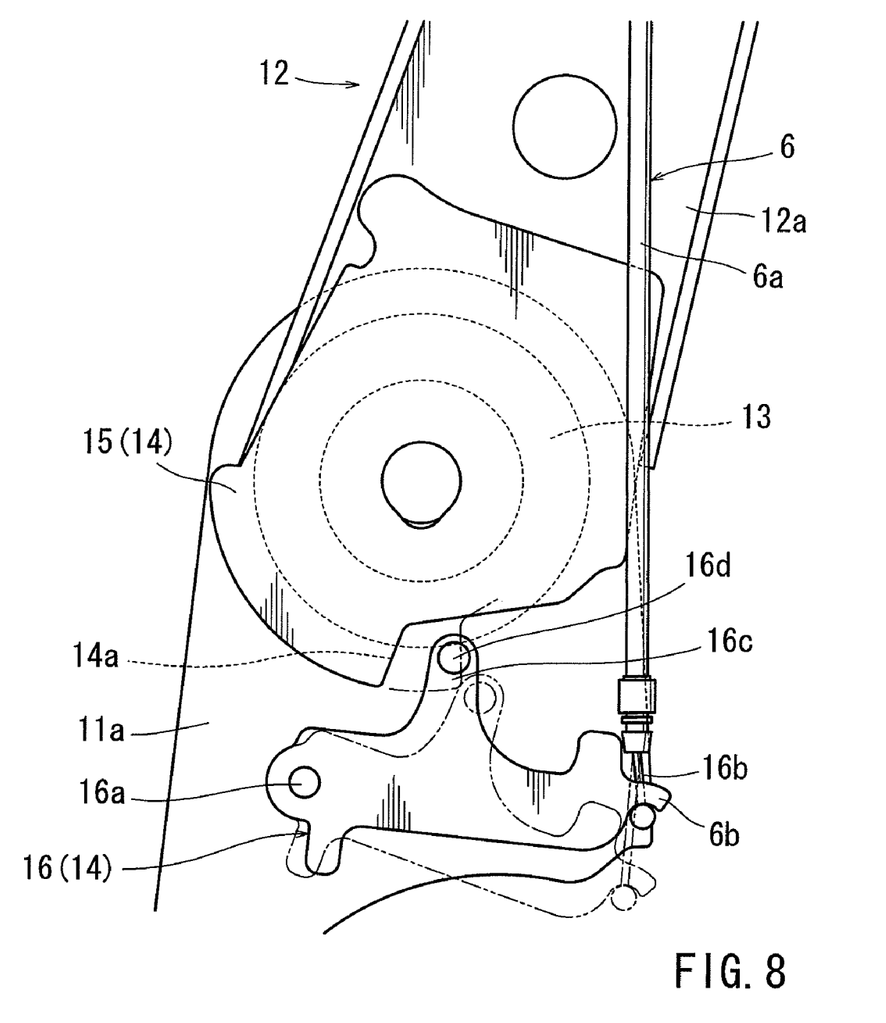
FIG. 8 is a side view of an interlocking device.

The cable 6 is led around in the interior of the seatback 12, and then, as shown in FIG. 8, is attached to the frame 11a of the seat cushion 11 at one end of the outer cable 6a. On the other hand, one end of the inner cable 6b is attached to a releasing link 16 of an interlocking device 14. The interlocking device 14 is a device for pulling the inner cable 6b in association with the forward inclination of the seatback 12 and includes the releasing link 16 and a kicking member 15.

As shown in FIG. 8, the releasing link 16 includes a tilting shaft 16a to be attached to the frame 11a so as to be capable of tilting at the proximal end thereof, and a connecting portion 16b to which the inner cable 6b is connected at the tilting extremity side thereof. The releasing link 16 includes an extended portion 16c extending toward the kicking member 15 at the center thereof. The kicking member 15 is provided with a force receiving shaft 16d extending from the extended portion 16c in the direction of the paper plane of FIG. 8. The kicking member 15 is fixed to an end of the frame 12a of the seatback 12, and includes an extending strip 14a extending toward the front of the force receiving shaft 16d. The extending strip 14a swings with the seatback 12 and pushes the force receiving shaft 16d. Accordingly, the releasing link 16 tilts, the releasing link 16 pulls the inner cable 6b, the unlocking device 5 is operated by the inner cable 6b, and the locking device 4 is unlocked.

As shown in FIGS. 1 and 2, an operating lever 17 for unlocking the locking device 4 is attached to the side portion of the headrest 1. The operating lever 17 is attached to one end of the rod 5c as shown in FIG. 4, and rotates the rod 5c about the axis thereof by being tilted. Therefore, when the rod 5c is rotated about the axis, the hook 4a tilts and the locking device 4 is unlocked. Therefore, the body frame 3 is allowed to tilt with respect to the base member 2 by the operating lever 17. At this time, the swinging body 5a does not swing even when the rod 5c rotates about the axis thereof. Therefore, the inner cable 6b is prevented from being excessively pulled when operating the operating lever 17.

As described above, as shown in FIG. 4, the swinging body 5a includes the connecting portion 5a1 to which the one end of the inner cable (cable) 6b is connected. The inner cable 6b is disposed on the arcuate-shaped outer peripheral surface 5a2. And the inner cable 6b passes through the stay (tubular portion) 2a provided on the base member 2. When the inner cable 6b is pulled, the inner cable 6b is retracted into the stay 2a from the entrance 2a1 of the stay 2a which is located substantially on the tangent line of the arc of the outer peripheral surface 5a2.

Therefore, when the inner cable 6b is pulled, the swinging body 5a swings, and the inner cable 6b disposed on the arcuate shaped outer peripheral surface 5a2 of the swinging body 5a is retracted into the stay 2a from the entrance 2a1 of the stay 2a located substantially on the tangent line of the ark. Therefore, the angle of insertion of the inner cable 6b into the stay 2a does not change much irrespective of the pulled amount. Therefore, the inner cable 6b is hard to be applied with a large force. In addition, the swinging body 5a pushes the moving body 8 provided on the body frame 3 by the swinging movement thereof, and unlocks the locking device 4 via the moving body 8. Therefore, when the body frame 3 is tilted with respect to the base member 2, the moving body 8 rotates with the body frame 3 separately from the swinging body 5a and moves away from the swinging body 5a. Therefore, when the body frame 3 is tilted with respect to the base member 2, exertion of a large force on the inner cable 6b connected to the swinging body 5a is prevented.

As shown in FIG. 3, the swinging body 5a swings about the swing shaft extending vertically with respect to the front surface of the headrest 1. The moving body 8 includes the rod 5c extending substantially in parallel with the tilting axis of the body frame 3 with respect to the base member 2 and attached to the body frame 3 so as to be capable of rotating about the axis thereof and the force receiving member 5b extending from the rod 5c toward the swinging body 5a. When the swinging body 5a swings, the force receiving member 5b is pushed by the swinging body 5a and is tilted about the rod 5c, and the hook 4a of the locking device 4 mounted to the rod 5c is unlocked from the lock base 4b provided on the base member 2.

The headrest 1 has a large surface area along the front surface, and the length in the direction of thickness is short. In contrast, the swinging body 5a swings in the direction parallel to the front surface of the headrest 1 having a large surface area. Therefore, the swinging body 5a may be upsized to reduce a tensile force applied by the inner cable 6b. On the other hand, the rod 5c extends in parallel to the tilting axis of the body frame 3 and transmits a pushing force of the swinging body 5a to the hook 4a by being rotated about the axis thereof. The hook 4a tilts about the rod 5c and locks a tilting movement of the lock base 4b substantially vertically with respect thereto. Therefore, the locking device 4 is capable of locking the body frame 3 so as not to tilt with respect to the base member 2 with high degree of stability.

While the invention has been described with reference to specific configurations, it will be apparent to those skilled in the art that many alternatives, modifications and variations may be made. Accordingly, the present invention is intended to embrace all such alternatives, modifications and variations that may fall within the spirit and scope of the appended claims. For example, the present invention should not be limited to the representative configurations, but may be modified as described below.

(1) In FIG. 3, the moving body 8 is adapted to swing (move) about the rod 5c with respect to the body frame 3. However, a configuration in which the moving body is provided so as to be movable in parallel with the body frame and unlock the locking device by moving in parallel is also applicable.

(2) In FIG. 4, the stay (tubular member) 2a is provided on the base member 2, the entrance 2a1 of the stay 2a is located substantially on the tangent line of the arc of the outer peripheral surface 5a2 of the swinging body 5a, and the inner cable 6b is inserted into the stay 2a from the entrance 2a1. However, a configuration in which the outer cable (tubular portion) is provided in the base member, the entrance of the outer cable is located substantially on the tangent line of the arc of the outer peripheral surface of the swinging body, and the inner cable is inserted from the entrance into the outer cable is also applicable.

(3) In FIG. 3, the base member 2 is attached so as to be adjustable in position in the vertical direction with respect to the seatback 12. However, a configuration in which the base member is attached so as not to be adjustable in position with respect to the seatback is also applicable.

What is claimed is:
1. A headrest for a vehicle seat comprising:
a base member attached to a seatback of the vehicle seat;
a body frame tiltably attached to the base member;
a locking device for locking the body frame to the base member so as not to be capable of tilting; and an unlocking device for unlocking the locking device, wherein:

the unlocking device includes a swinging body attached to the base member so as to be capable of swinging and a moving body attached to the body frame so as to be capable of moving with respect thereto, the moving body moves with respect to the body frame by being pushed by the swinging body to unlock the locking device, the swinging body includes a connecting portion connected to one end of a cable and an arcuate-shaped outer peripheral surface on which the cable is disposed, and the cable is retractable into a tubular portion provided on the base member through an entrance of the tubular portion when the cable is pulled to unlock the locking device, the entrance of the tubular portion is located substantially on a tangent line of the arc of the outer peripheral surface of the swinging body.

2. The headrest for a vehicle seat as in claim 1, wherein:

the swinging body is capable of swinging about a swing shaft extending vertically with respect to the front surface of the head rest, and the moving body includes a rod extending substantially in parallel to a tilting axis of the body frame with respect to the base member and is attached to the body frame and is capable of rotating about an axis thereof, and a force receiving member extending from the rod toward the swinging body, wherein when the swinging body swings, the force receiving member is pushed by the swinging body to rotate the rod, and a hook of the locking device mounted to the rod is unlocked from a lock base provided on the base member.

3. A headrest for a vehicle seat comprising:

a base member attached to a seatback of the vehicle seat;

a body frame attached to the base member;

a locking device capable of locking the body frame with the base member; and an unlocking device capable of unlocking the locking device, wherein:

the unlocking device includes a swinging body attached to the base member and a moving body attached to the body frame, the moving body is capable of moving with respect to the body frame via the swinging body to unlock the locking device, the swinging body includes a connecting portion, wherein one end of a cable is connected to the connecting portion, the swinging body further includes an arcuate-shaped outer peripheral surface on which the cable is disposed, and the cable is retractable into a tubular portion provided on the base member when the cable is pulled to unlock the locking device, an entrance of the tubular portion is positioned substantially on a tangent line of the arc of the outer peripheral surface of the swinging body.

4. The headrest for a vehicle seat as in claim 3, wherein:

the swinging body is capable of swinging about a swing shaft extending vertically with respect to the front surface of the head rest, and the moving body includes a rod extending substantially in parallel to a tilting axis of the body frame with respect to the base member and is attached to the body frame and is capable of rotating about an axis thereof, and a force receiving member extending from the rod toward the swinging body, wherein when the swinging body swings, the force receiving member is pushed by the swinging body to rotate the rod, and a hook of the locking device mounted to the rod is unlocked from a lock base provided on the base member.

* * * * *